(No Model.)
E. W. WATKINS.
STEAMER.
No. 346,334. Patented July 27, 1886.
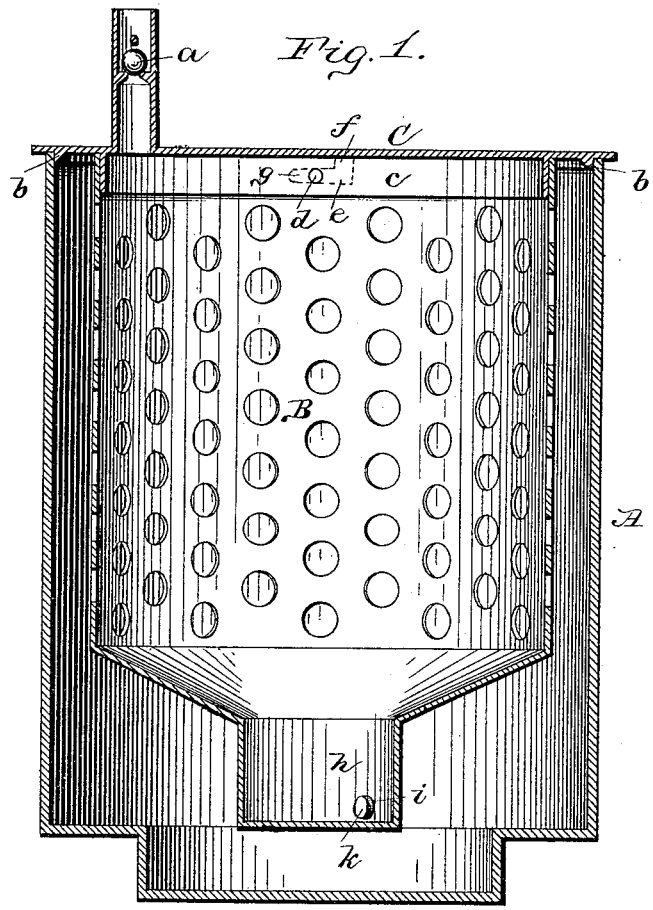
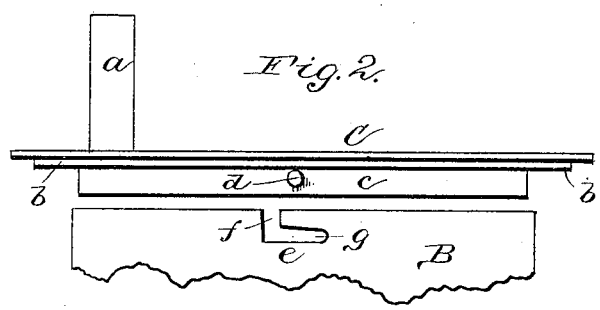
WITNESSES
M. E. Fowler
Wm N. Moore
INVENTOR
E. W. Watkins
per J. W. Garner
Attorney

UNITED STATES PATENT OFFICE.

EDGAR WILLIAMS WATKINS, OF FALLS CHURCH, VIRGINIA.

STEAMER.

SPECIFICATION forming part of Letters Patent No. 346,334, dated July 27, 1886.

Application filed September 14, 1885. Serial No. 177,038. (No model.)

*To all whom it may concern:*

Be it known that I, EDGAR WILLIAMS WATKINS, of Falls Church, county of Fairfax, and State of Virginia, have invented a new and useful Improvement in Steamers; and I do hereby declare that the following is a full, clear, and exact description of the invention, which will enable others skilled in the art to which it appertains to make and use it, reference being had to the accompanying drawings, forming a part thereof.

My invention relates to an improvement in steamers; and it consists in the combination, with a pot of suitable construction, of a perforated steaming-vessel that is suspended in the pot; and it further consists in the peculiar construction and combination of devices, that will be more fully set forth hereinafter.

In the accompanying drawings, Figure 1 is a vertical sectional view of a steamer embodying my invention. Fig. 2 is a detailed view.

A represents a pot or vessel of suitable construction, and B represents a steaming-vessel, that is perforated and suspended to a cover, C, that is placed on the pot. This cover has a steam-valve, $a$, a depending flange, $b$, to adapt the cover to fit snugly on the upper edge of the pot, and an annular depending flange, $c$, arranged concentrically within the flange $b$, and at a suitable distance from the inner side of the pot. Horizontal pins $d$ project outwardly from this flange at about equidistances apart.

The upper edge of the steaming-vessel B is provided with a series of rectangular slots, $e$, having each an open vertical portion, $f$, and a horizontal portion, $g$, extending from the lower side of the vertical portion, and communicating therewith. The upper sides of the horizontal portions of the slots are slightly inclined, as at $g$. These slots correspond in number to the pins or studs $d$, and are adapted to receive said pins or studs when the cover is secured to the steaming-vessel.

The bottom of the steaming-vessel is not perforated, and is funnel-shaped, as shown, and from the center of this bottom depends a non-perforated drip-cup, $h$, which has an opening, $i$, on one side, near its bottom. A plug or cork, $k$, closes the opening $i$.

The operation of my invention is as follows:

A small quantity of water is placed in the pot and raised to the boiling-point. The oysters or vegetables or meats to be steamed are placed in the steaming-vessel, and the cover is secured thereto by causing the studs or pins to enter the vertical portions of the slots, and then turning the cover on the steaming-vessel sufficiently to cause the studs or pins to enter the horizontal portions of the slots. Owing to the inclined upper sides of the slots, the cover is clamped to the steaming-vessel very tightly. The steaming-vessel is then placed in the pot and is suspended therein from the cover, which fits snugly on the upper edge of the pot, as before described. The steam which results from the boiling water in the pot is compelled to go through the steaming-vessel, in order to find an outlet, and escapes through the valve in the cover. By means of this valve steam may be maintained in the pot at any desired pressure. When it is desired to retain the juices from the articles that are being steamed, the plug is inserted in the opening in the drip-cup, and the drip-cup collects and preserves said juices as the steaming process is going on. When it is not desired to retain the juices, the plug will not be placed in the opening.

A steamer thus constructed is cheap and simple, is thorough and efficient in operation, and all the steam generated in the boiler or pot is forced to pass through the steaming-vessel before it can escape, as by suspending the steaming-vessel from the cover the weight of said vessel and its contents causes the cover to fit the pot practically steam-tight.

Having thus described my invention, I claim—

1. The combination, in a steamer, of the pot, the cover having the depending flange fitting inside the pot, and the blow-off valve $a$ in the cover, and the perforated steaming-vessel having the non-perforated funnel-shaped bottom, and the drip-cup depending therefrom, the said steaming-vessel being detachably secured to the cover and suspended therefrom in the pot, substantially as described.

2. The combination, in a steamer, of the pot, the cover having the depending flange $b$ and the blow-off valve $a$, and the perforated steaming-vessel detachably secured to the cover and suspended therefrom in the pot, the said steaming-vessel having the non-perforated funnel-shaped bottom, and the drip-cup $h$ depending therefrom, the said drip-cup having an opening, $i$, and a plug or cork for closing the opening, substantially as described.

3. The combination of the pot and the perforated steaming-vessel located therein, and having the non-perforated funnel-shaped bottom, the drip-cup depending therefrom, and having the opening, and the cork or plug for the opening, substantially as described.

In testimony that I claim the foregoing I append my signature.

EDGAR WILLIAMS WATKINS.

Witnesses:
 MATIE E. WATKINS,
 LILY F. GARNER.